BENJAMIN HENDRICKSON, OF HUNTINGTON, NEW YORK.

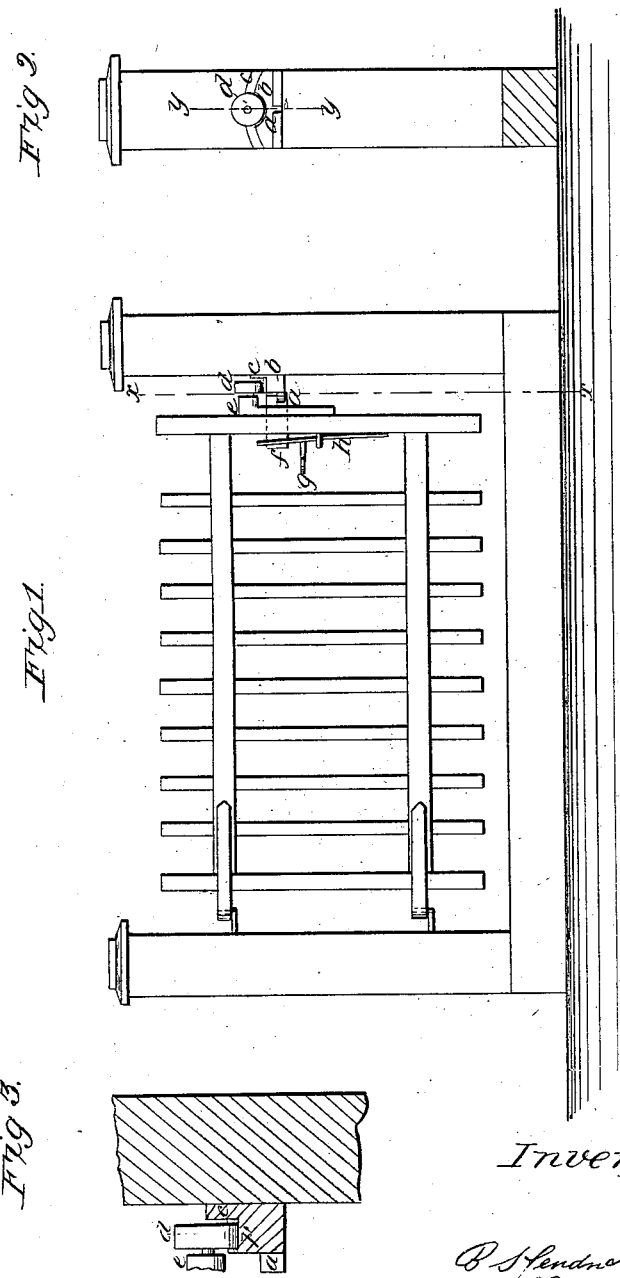

Letters Patent No. 84,945, dated December 15, 1868.

IMPROVEMENT IN GATE-LATCHES.

The Schedule referred to in these Letters Patent and making part of the same.

*To all whom it may concern:*

Be it known that I, BENJAMIN HENDRICKSON, of Huntington, in the county of Suffolk, and State of New York, have invented a new and improved Gate-Latch; and I do hereby declare that the following is a full, clear, and exact description thereof, which will enable those skilled in the art to make and use the same, reference being had to the accompanying drawings, forming part of this specification, in which—

Figure 1 is a front elevation of a gate provided with my improved latch.

Figure 2 is a front view of the latch-plate from a section through the line $x\ x$, fig. 1.

Figure 3 is an enlarged detail section of the latch-plate through the line $y\ y$, fig. 2.

Similar letters of reference indicate corresponding parts.

The object of this invention is to provide a means by which farm and other gates may be sustained partially upon the latch-post while the gate is closed, and also operated more easily in closing and opening the same.

It consists in the combination and arrangement of parts whereby the gate is adapted to be supported and swung in either direction.

A is the latch-post, having affixed thereto the latch-plate $a\ b\ c$, preferably of cast-iron.

The part $a$ of the latch-plate is notched for the latch-bar $f$ to catch into.

The part $b$ is arched and notched for the roller $d$ to rise on and catch into when the gate is closed, thus taking the greater part of the strain from the hinges of the gate.

The part $c$ is simply a shoulder to guide the roller.

The roller works on a stud formed on the plate $e$, which latter is affixed to the gate, as shown.

$g$ is the handle, and $h$, the spring bearing the latch-bar $f$, as shown.

The said latch-bar passes through a proper slot in the plate $e$.

I claim as new, and desire to secure by Letters Patent—

The combination of the double-inclined part, $b$, of the latch-plate, with the parts $a\ c$, and the roller $d$, all arranged as set forth, whereby the gate is permitted to swing in either direction, as herein shown and described.

The above specification of my invention signed by me, this 8th day of June, 1868.

BENJAMIN  $\overset{\text{his}}{\times}$  HENDRICKSON.
mark.

Witnesses:
 FRANK BLOCKLEY,
 ALEX. F. ROBERTS.